Dec. 24, 1968  R. F. K. SCHULZE ET AL  3,417,621
METHOD AND APPARATUS FOR GRAVITY MEASUREMENTS
Filed Aug. 23, 1965
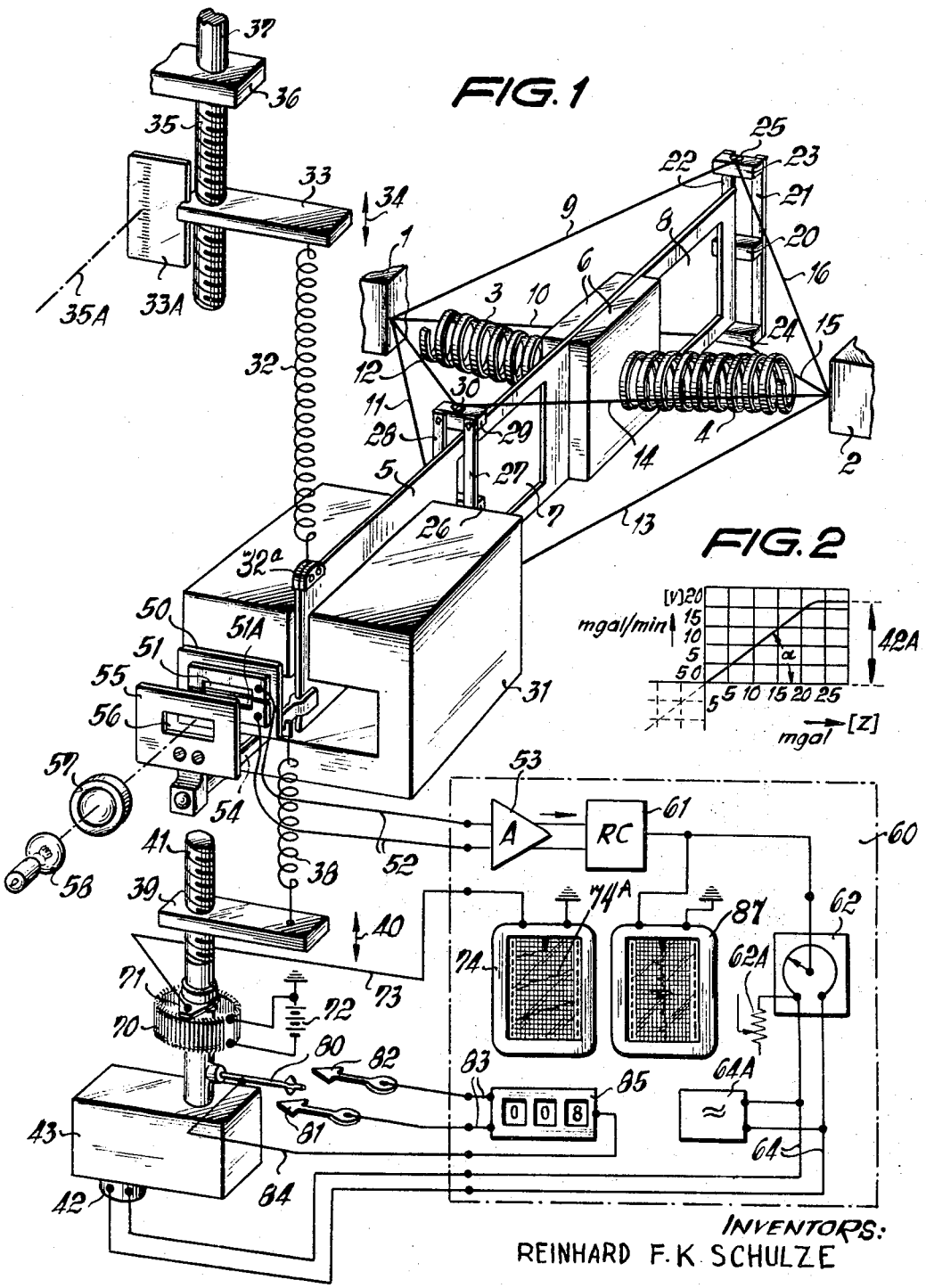
INVENTORS:
REINHARD F. K. SCHULZE
Eberhard Thebis
ERNST HEINRICH BREDE
By: Samuel W. Kipnis
Attorney.

United States Patent Office 3,417,621
Patented Dec. 24, 1968

3,417,621
METHOD AND APPARATUS FOR GRAVITY MEASUREMENTS
Reinhard F. K. Schulze, Berlin-Lankwitz, Ernst Heinrich Brede, Berlin-Tegel, and Eberhard Thebis, Berlin-Lichterfelde, Germany, assignors to Continental Elektroindustrie A.G. Askania-Werke, Berlin-Mariendorf, Germany, a corporation of Germany
Continuation-in-part of application Ser. No. 212,516, July 26, 1962. This application Aug. 23, 1965, Ser. No. 483,022
5 Claims. (Cl. 73—382)

ABSTRACT OF THE DISCLOSURE

A gravimeter for use on moving vehicles has its gravity-responsive mass pivoted and restrained for motion about a horizontal axis. The mass is balanced by spring force which is continuously adjusted to normally hold the mass in null position. Any gravity-responsive tendency of the mass to slowly depart from the null position is sensed electrically and causes a signal to control a motor which changes the spring adjustment in the sense required to preserve the null position, such change being indicated as a measure of gravity. Fast departures of the mass from the null position, as are due to vehicle attitude, are damped by speed-responsive magneto-electric damping.

---

This disclosure is a continuation of our application Ser. No. 212,516, filed July 26, 1962, and claiming a right of priority based upon a German application filed abroad on May 18, 1962.

This invention relates to improvements in methods and apparatus for measuring gravity and particularly for measuring and recording gravity changes on vehicles undergoing motions which interfere with the gravity measurement.

A gravimeter embodying some of the structural features of the best embodiments of the invention is shown and claimed in a patent of Graf, No. 3,019,655, issued February 6, 1962. Basically, the gravimeter there disclosed comprises a gravimeter mass having tension means connected therewith for limiting the degree of freedom of movement of the mass about its mounting in a horizontal plane, and means for damping its vertical vibration; the gravimeter mass is mounted on a horizontal axis and balanced in a substantially horizontal position by a suitable spring, changes in gravity producing vertical deflections. Such a gravimeter is installed in moving vehicles such as planes and ships, on a gyroscopically (or otherwise) stabilized and leveled platform.

The unwanted deflections produced by motions of the vehicle cause the mass to oscillate in a vertical plane about the horizontal axis on which it is pivoted. These oscillations are of relatively short period, about 5 to 10 seconds, depending on the movement of the vehicle, and can well produce deflections corresponding to those produced by about 50,000 to 100,000 mgal.

(1 mgal. $= 10^{-3}$ cm./s.$^2$)

change in vertical force. The movement of the vehicle along the gravity profile to be determined produces changes of the force of gravity at a rate of the order of 1–50 mgal./min. (or in extreme cases several hundred mgal./min.). The forces produced by gravitational attraction thus vary relatively slowly as compared with the more or less periodic accelerative forces producing the deflections injurious to the measurement. The gravitational forces thus appear as a displacement of the center of the oscillations of the gravimeter mass. By properly selecting the damping of the system and continuously recording the oscillations, it is possible to determine the gravity profile, but there is a substantial time-lag in the readings. This delay or lag may amount to several minutes and depends, among other factors, on the shape of the gravity profile. For example, a sudden change in a gravity profile of, for instance, 100 mgal., requires ten or more minutes for the reaching of new equilibrium of the recorder. During this time lapse the gravity value has again changed at the instantaneous location of the moving vehicle. Therefore, rapid measuring of high-gradient gravity profiles with gravimeters of known construction is rather difficult, if not impossible, and the detection of local anomalies with great precision is not possible in a reasonable time.

Certain compensation methods have been heretofore suggested for dealing with the problem. In one type of suggested method or principle, any change in the position of the gravimeter mass is sensed by means of a photoelectric, inductive, capacitative or other type of electric position transducer. In such a system an electric current is transmitted from the transducer to the electromagnet power supply, which acts on the mass to oppose the deflection. In equilibrium, the current is then a measurement of the forces affecting the gravimeter mass and can be directly recorded; but such systems do not have the necessary accuracy with practical constructions. Amplifiers with a very wide dynamic range are desirably available for the generation of the compensating current because the forces which are to be compensated can amount to $\pm 50,000$ mgal. while design is generally aimed at a resolution of about $\pm 1$ mgal. Therefore, gravimeters using such principles cannot be manufactured at reasonable cost.

The gravimeter of the present invention is also of the type in which the deflection of the gravimeter mass from a zero position is sensed by means of an electric position transducer. This transducer controls a force variation which affects the gravimeter mass by compensating for its deflection. Specifically, the compensating force is transmitted to the gravimeter mass by means of a relatively light or yielding auxiliary spring, the tension of which is varied by means of a mechanical adjusting device controlled in its adjusting speed and direction in response to deflection of the gravimeter mass, but with provision for discriminating, in such adjustment, against response to the fast changes of deflection produced by the unwanted oscillations. The adjusting speed is, for small deflections, proportional to the deflection, but has a maximum value. The position of the adjustment member which regulates the spring tension is recorded as a function of time.

Adjustment of the spring tension preferably is effected by an electric motor, the speed of which can be readily controlled. For example, a servomotor which is rapidly reversible and has a rotor having a very low moment of inertia may be used.

In the present gravimeter system, the mass will still undergo damped oscillations around its center of oscillation; the rapid changes of deflection, not affecting the average, are deliberately disregarded in the adjustment of the spring tension, rather than trying to counteract the forces producing them, while the slower displacements, represented by changes in the center of oscillation of the gravimeter mass, are compensated and the center of oscillation remains in its original or zero position. Therefore, the tension of the compensation spring is a measurement of the force of gravity, with much or all of the spurious oscillatory motion of the gravimeter mass eliminated from the recorded measurement. In part, the discrimination against the faster motions of the mass in adjustment of the spring is accomplished by limiting the speed of adjustment to produce inability to follow the relatively rapid oscillatory motions, the speed of adjustment being limited to substantially correspond to the fastest change in gravitational field which is desired to be measured. In addition, the reaching of this maximum speed at fairly small deflection serves to further suppress, in the measurement, the relative amplitude of response to the large-deflection oscillations. The insensitivity to the spurious oscillations is also aided by employing a low-pass filter in the transmission path of the signal representing the position of the mass, between the transducer and the motor which makes the adjustment. A filter attenuating frequencies of periods shorter than 100 seconds or so is desirable for most marine profile measurements.

The relation between the adjustment speed of the servomotor and the displacement of the gravimeter mass for small deflections of the gravimeter mass from its zero position should preferably be linear, with adjustable slope. Small deflections may be considered as those which would be produced by static forces on the gravimeter mass of less than about 100 mgal., in the absence of compensation. These correspond to a normal range of variations of a gravity profile. Above these forces, up to about ±50,000 mgal. or more, the adjustment-speed curve should be such that no substantial increase of the adjustment speed takes place. On ships moving at a speed of about 30 km./h., a maximum change of tension on the compensation spring corresponding to about 10 mgal./min. has been found to be adequate. For measurements on faster moving vehicles a relatively higher adjustment speed, for example 100 mgal./min., should be selected.

As will be observed from the general description above, the general method of measurement described, although best performed automatically by the novel apparatus of the invention, may also be performed manually by proper manipulation of gravimeters heretofore known. It is accordingly the principal object of this invention to provide a gravimeter for the purposes described. Another object is to provide a force-measuring method which will accurately measure gravitational forces as a function of the location of a moving vehicle on which the measurements are made, and thus as a function of time. The invention further provides a novel apparatus for adjusting the zero position of a gravimeter mass and for measuring and recording the position of the gravimeter mass.

Another object is to provide novel means for visually recording the mean value of torsional movements of a gravimeter mass as a function of time.

FIGURE 1 is a graphic illustration of a gravimeter device incorporating the invention.

FIGURE 2 is a diagram illustrating the speed characteristic of a compensation servomotor constituting a portion of the device of FIGURE 1, in terms of the speed of force adjustment as a function of force-equivalent deflection.

Referring to the exemplary form of the device shown in the accompanying drawings, a lever 5 is suspended between two fixed points 1, 2, in a housing (not shown) on a pair of torsion springs 3, 4. The lever 5 preferably comprises a two-armed structure which is pivotally secured, as by means of blocks 6, to the torsion springs 3, 4. As shown, its center of gravity is located forwardly of the torsion axis and it functions as a gravimeter mass. Preferably, the lever 5 is fabricated from a strip of metal such as aluminum, preferably cut out, as at 7, 8, to reduce its moment of inertia. The initial torsion of springs 3, 4, tends to hold the lever 5 in a horizontal position when external forces are absent.

The lever or gravimeter mass 5 is limited in its movements by means of tension means 9, 10, 16, 15, 12, 14, 13 and 11, preferably in the form of thin guy wires, each of which has one of its ends secured to the housing, as at points 1, 2, which are on the torsional axis of the assembly. The other ends of said wires are connected firmly to the lever substantially in the manner now to be described.

The lever 5 has mounted fixedly thereon at its rearward end, as viewed in the drawings, a cross bar 20 which is in turn secured to the medial portion of a pair of spring plates 21, 22 which have their ends bridged by firmly attached bars 23, 24. The tension wires 9, 16, and 10, 15, are secured, respectively, to said bars 23, 24. A like bar 26 is secured to the other or front portion of lever 5 and is likewise secured firmly to a pair of spring plates 27, 28 joined by end bars 29 (one shown). The tension wires 12, 14 and 11, 13 are secured respectively, to said bars 29. This manner of tensioning lever 5 insures that said lever cannot swing in any direction other than in a vertical plane about its torsional axis. Effective shocks are accelerate forces in the direction of lever 5 cause the spring plates 21, 22 and 27, 28 to yield in the direction of the shock, thereby preventing breaking of the tension means 9 to 16. While this restraining is accomplished by mechanical means, it could of course be accomplished by using magnetic or other means.

Vertical accelerations deflect the gravimeter mass from its normal horizontal position. Purely linear deflection over the entire range of accelerations in the vertical plane would be desirable; however, since it is difficult to maintain linearity of deflection upon certain accelerations within the range to be expected in practice, this range is, in effect, narrowed by providing powerful damping means which greatly reduce the oscillation propensity of the measuring system. While this damping can be achieved mechanically or otherwise, it is shown as being obtained by eddy-current action. It is important, for best results, that the damping be of a type proportional to the velocity of the mass, in order that the mean value of the damped oscillation be independent of the degree of damping applied to the system. Accordingly, the forward end of the long arm of the gravimeter mass 5 extends freely into the air gap of a permanent magnet 31, which serves as an eddy-current brake for damping.

A relatively light or low-force spring 32 is connected at its lower end to the free forward end of the mass 5, at 32a. Its upper end is connected to an elevated support bar 33 that is suitably held against rotation and is threaded onto an adjusting screw 35 carried by the support housing. The relative height of support bar 33 is adjustable upon manipulation of screw 35 so as to adjust the position of mass 5 into a zero position vertically. For this purpose one end of support bar 33 may be associated with a calibrated chart or glass scale 33A and vertical adjustment of said bar 33 may be effected while optically viewing the scale along a line 35A by means of an optical reading microscope, not shown. Thus, the effective pull of spring 32 can be read from the scale 33A. The force exerted by spring 32 upon the mass is small as compared to the torsional moment effected by torsion springs 3, 4; thus the major part of the gravitational torsional moment of the gravimeter mass 5 about springs 3, 4 is compensated by said torsional springs.

Vertical accelerations imparted to the gravimeter housing cause vertical accelerations of the gravimeter mass 5 which are subjected to extremely forceful velocity damping. The overall result of the structure, without the further provision to be described, is limited, more or less periodic, vertical movements of the gravimeter mass which center about the position of the mass properly corresponding with the locally prevailing terrestrial gravity, without falsification by influences such as transverse oscillation of the springs. The oscillations of the gravimeter are linear and symmetrical about said position. In the present invention, deviation of this center of oscillation from its zero position is utilized to generate direct current to control operation of a servomotor restoring this center.

Referring again to the drawings, the current generation means includes a holder 50 fixed on the housing adjacent to the free forward end of mass 5 and carrying a pair of photoelectric elements 51, 51A. These elements are connected differentially, and the output appears on lines 52 and is supplied to a direct current amplifier 53 in a motor control recorder system generally indicated at 60.

The gravimeter mass or lever 5 carries on its free forward end an arm extension 54 mounting a slit diaphragm 55 having its slit 56 disposed in front of the photoelectric elements 51, 51A. This slit is illuminated by means of an optical image forming system 57 and by a light source 58 in a manner to cast the image on the two elements 51, 51A. When the slit image is symmetrically distributed, each of said elements generates the same voltage. Vertical deflection of the gravimeter mass 5 from its zero position causes the elements to generate an output which is proportional to the deflection, with polarity indicative of direction. The voltage in lines 52 is accordingly a measurement of the position of the gravimeter mass 5.

The direct current in lines 52, which is proportional to the deflection of mass 5, is fed through amplifier 53 to an RC combination 61 which acts as a low-pass filter, the output of which is supplied to the input of an electrical control element 62, which produces an alternating control voltage output to lines 64 connected to a servomotor 42. The operation and purpose of this motor will be explained presently, but it may be noted here that the amplitude of the alternating voltage determines the number of revolutions of the motor, and that its phase angle, which changes by 180° at the zero position of lever 5, determines the direction of rotation of the motor.

As shown, motor 42 is connected, through a reduction gear box 43, with a shaft 41 threaded at its free end and threadingly mounting an arm 39 that is suitably held against rotation therewith. The arm 39 has connected to it one end of a low-force spring 38, the other end of which is connected to lever extension arm 54. The tension of spring 38 is adjusted by adjustment of the position of arm 39 by operation of motor 42 and rotation of screw shaft 41. In an exemplary embodiment, the maximum number of revolutions of said motor is 3600 r.p.m., which is geared down through the reduction gearing, for rotating the screw shaft 41, by a factor of 1:30,000.

The arrangement is set up in such a manner that for small deflections of mass 5 from its zero position, the speed of the motor 42 increases linearly with the deflection angle. This characteristic can be seen from the diagram of FIGURE 2. On the horizontal (Z) axis of this diagram, the static forces which would cause mass 5 to deflect from its zero position by equivalent amounts are shown in mgal., while on the vertical (V) axis, the number of revolutions of motor 42, or the rate of change of tension of spring 38, are shown in mgal./min. For small deflections of the mass, the rate of operation of the motor is directly proportional to the deflection, but no further increase of the rate occurs for force-equivalent deflections beyond the limits of this range. The angle of inclination "$a$" (FIGURE 2) of the speed characteristic is adjustable by means of a potentiometer 62A on the control 62. Means (not illustrated) are desirably provided for adjustment of the limit 42A (FIGURE 2) at which no further increase of the speed of the motor takes place. As will be obvious, such adjustments may be used to optimize, for the particular conditions of a profile run, the speed of following and recording gravity changes and the degree of suppression of spurious motions in the recording, optimum settings of course varying with gravity gradient, speed of the vehicle, and exact amplitude and frequency of vertical motions of the vessel.

The control 62, shown highly schematically, is preferably of the type sometimes called "PI" (proportional and integrated-error), producing, from the direct voltage $x_w$, an output signal variable as $$y = ax_w + b \int x_w dt$$

with output phase representative of input polarity. The factors of proportionality $a$ and $b$ are adjustable on the control. However, the control has a maximum output value (for deviation in either direction) which is reached at relatively small deflection signals. This maximum output value, and thus the maximum motor speed, is adjustable at 62A. Thus the motor is driven in the direction to compensate a deflection at a speed which is proportional to the deflection and the time-integral of deflection when these are small, but at a constant speed beyond any preset maximum value of these, remaining at that constant speed until the deflection returns to the point where the motor again commences to slow.

The output voltage of an auxiliary voltage source 64A is supplied to the motor 42. The alternating voltage from this source causes a variable, periodic swinging (for instance with the frequency of 1 Hz.) of the motor shaft to overcome starting friction and permit small adjustment of screw 41 when small gravity-change deflections occur at times when the mass 5 is undergoing no oscillations around its zero position.

For the purpose of visibly registering the gravity changes, the screw 41 is coupled to a potentiometer 70–71 which is concentrically arranged on the axis of screw 41. The winding 70 is fixedly mounted on the housing and the wiper 71 taps a portion of the voltage of a battery 72 from the winding 70 of the potentiometer. This voltage, corresponding to the position of screw 41, is supplied to the input of a continuous recording instrument 74 through line 73. As the screw 41 is turned at any uniform speed, the voltage increases with the angle of rotation from 0° to 360°, and then drops back to zero and recycles. This saw-tooth voltage is recorded by the continuous line recording instrument 74, shown at 74A; as the wiper 71 recycles, the trace of the recording instrument goes directly across from one edge of the recording tape to the other. This type of recording greatly increases the measuring range of the gravimeter, making it now possible, for instance, to cover a direct measuring range of about 7000 mgal., whereby a continuous recording of the entire field of gravity of the earth can be obtained without any adjustment of the zero-point spring 32.

The number of revolutions of screw 41 may be counted in any well-known fashion, illustrated schematically as a contact 80 which interacts with two contacts 81 and 82 on the housing, one in each direction of rotation of the screw, producing electrical impulses transmitted to an electro-mechanical counter 85 through the lines 83, 84. The counter 85 records the number of revolutions of screw 41 in add-and-subtract fashion controlled by the direction of rotation. The output voltage of the RC combination 61 and of the amplifier 53 is supplied to a second recorder 87 which can be used, by suitable analysis of its record, as a supplement to the recording made by the recorder 74. This is especially desirable if compensation by the motor 52 is not fast enough to follow gravity gradients of a magnitude exceeding those expected in making the adjustments.

The herein described exemplary device can obviously be modified in many different ways. As one example, it is possible to replace the electric motor 42 by a hydraulic or pneumatic motor, the operating speed of which may be controlled by suitable regulators. If an electric regulator is used, it is advantageous to provide for adjustment of the limit, depending on the expected course of a gravity profile, by means of voltage-limiting means which are best located at the input of the control 62, resistors being usable for this purpose. However, the change of the limit can also be carried out by changing the ratio of the reduction gears in the reduction gear housing 43.

Many other modification, some immediately obvious and some apparent only after study, can likewise be made without departure from the teachings of the invention. Many modified forms of the invention will of course be far different in details than herein described, and it will be seen that the general method may, in fact, be employed in normal operation of devices heretofore known, although of course much less advantageously. Accordingly, the scope of the patent protection to be given the invention should not be determined from the particular embodiment herein described, but should extend to all methods and structures set forth in the annexed claims, and equivalents thereof.

What is claimed is:

1. A gravimeter comprising:
   (a) a gravimeter mass shaped as a lever and pivotally mounted for motion in a vertical plane,
   (b) torsion spring means urging the gravimeter mass upwardly with a force slightly less than gravitational force,
   (c) an assembly of two elongated tension springs mounted respectively above and below the gravimeter mass and secured thereto, said assembly being held in tension at its upper and lower ends and exerting an upward force on the mass acting with the torsion spring force to balance the gravimeter mass in a substantially horizontal reference position,
   (d) position-transducer means for producing an electrical signal indicative of magnitude and direction of deflection of the mass from the reference position,
   (e) a reversible motor,
   (f) means including a low-pass filter coupling the transducer to the motor to actuate the motor in a direction responsive to the direction of deflection at a speed increasing with the deflection signal for small deflection signals but having a maximum value,
   (g) speed-reducing gears driven by said motor,
   (h) a tensioning member secured to an end of the tension spring assembly and driven by the gears to adjust the tension in the direction to compensate the deflection,
   (i) and means for recording the movements of the tensioning member.

2. A gravimeter comprising:
   (a) a gravimeter mass mounted for vertical motion,
   (b) first spring means urging the gravimeter mass upwardly with a force slightly less than gravitational force,
   (c) second spring means exerting an upward force on the mass acting with the first spring means to balance the gravimeter mass in a reference position,
   (d) a position-responsive transducer for producing an electrical signal indicative of magnitude and direction of deflection of the mass from the reference position,
   (e) means for adjusting said second spring means to balance changes in gravitational field,
   (f) continuous control means connecting the transducer to the adjusting means to actuate the latter in a direction to continuously compensate relatively slow components of deflection due to gravity-responsive motion of the mass, the adjusting means being relatively less responsive to more rapid motions, speed-proportional damping means being joined with the mass for damping said rapid motions,
   (g) and means for recording the adjustments effected by the adjusting means.

3. A gravimeter including a support, a movable gravimeter-mass element which forms a lever journalled on a horizontal axis in said support for motion in a vertical plane, tension spring means connected to said movable element, adjusting means mechanically connected to said spring means for varying the tension of said spring means to susbtantially maintain said movable element in a horizontal reference position, an electric motor for operating said adjusting means, damping means for speed-proportional damping of said movable element in response to motion more rapid then gravity-responsive deflection, an electric position detector for sensing the position of said movable element relative to the support, and continuous control means for controlling the electric motor to run in dependence upon response of said detector at a speed substantially proportional to said gravity-responsive deflection up to a given limit speed, and means to record the amount of tension variation.

4. A gravimeter for measuring the force of gravity in a moving object comprising, in combination, a support defining an approximately horizontal axis, torsion spring means secured at one end to the support on said axis, a gravimeter mass secured to the other end of said torsion spring means and pivotally movable about said axis in a plane normal to said axis, means to restrain the mass from movements relative to said support other than in said plane, means for strongly damping the movements of said mass substantially in proportion to the speed of movements of said mass in said plane, soft spring means to compensate for movements of the mass acting continuously both upwardly and downwardly against movement of said gravimeter mass, and means for visually recording the mean value of torsional movements of said gravimeter mass as a function of time.

5. A gravimeter comprising an elongated mass which forms a lever pivoted about a horizontal axis for movement in a vertical plane in response to gravitational forces, spring means connected to said elongated mass for biasing it to a horizontal reference position, speed-proportional eddy-current damping means for damping the movements of said elongated mass, an electric position detector for sensing the position of said elongated mass, continuously operable counterbalancing means coupled with said mass for compensating the mass-deflecting effect of gravity variations, electric control means connecting said detector to said counterbalancing means for adjusting said counterbalancing means to substantially maintain said mass in said reference position regardless of gravity variations; and means for continuously indicating the counterbalancing adjustment as indicative of the gravity variations.

References Cited

UNITED STATES PATENTS

| | | | |
|---|---|---|---|
| 2,977,799 | 4/1961 | LaCoste | 73—382 |
| 3,103,820 | 9/1963 | Haalck | 73—382 |

RICHARD C. QUEISSER, *Primary Examiner.*

C. I. McCLELLAND, *Assistant Examiner.*